United States Patent [19]
Webber et al.

[11] Patent Number: 5,367,698
[45] Date of Patent: Nov. 22, 1994

[54] NETWORK FILE MIGRATION SYSTEM

[75] Inventors: Neil F. Webber, Hudson; Robert K. Israel, Westford; Gregory Kenley, Northborough; Tracy M. Taylor, Upton; Antony W. Foster, Framingham, all of Mass.

[73] Assignee: Epoch Systems, Inc., Westborough, Mass.

[21] Appl. No.: 786,248

[22] Filed: Oct. 31, 1991

[51] Int. Cl.$^5$ .................................................. G06F 13/00
[52] U.S. Cl. ........................... 395/800; 364/DIG. 1; 364/243.2; 364/243.4; 364/242.94; 364/246.1
[58] Field of Search ...................... 395/575, 600, 800; 364/DIG. 1 MS File

[56] References Cited

U.S. PATENT DOCUMENTS

| | | | |
|---|---|---|---|
| 3,806,888 | 4/1974 | Brickman et al. | 364/DIG. 1 |
| 4,429,363 | 1/1984 | Duke et al. | 364/DIG. 1 |
| 4,934,823 | 6/1990 | Okami | 364/DIG. 1 |
| 5,077,658 | 12/1991 | Bendert et al. | 364/DIG. 1 |
| 5,089,958 | 2/1992 | Horton et al. | 395/575 |
| 5,133,065 | 7/1992 | Cheffetz et al. | 395/575 |
| 5,214,768 | 5/1993 | Martin et al. | 364/DIG. 1 |
| 5,218,695 | 6/1993 | Noveck et al. | 395/600 |
| 5,276,860 | 1/1994 | Fortier et al. | 395/575 |
| 5,276,867 | 1/1994 | Kenley et al. | 395/600 |

FOREIGN PATENT DOCUMENTS 971285 7/1975 Canada .
0205965 12/1986 European Pat. Off. .

OTHER PUBLICATIONS

Beeler, J. "GTE Tries Incremental Backup", *ComputerWorld*, vol. 21, No. 40, Oct. 9, 1989, pp. 61, 64.
Muuss et al., "Bump The BRL/USNA Migration Project", Mar. 5, 1989, pp. 1–19.
Thompson et al., "The Operation and Use of a 2 Tetrabyte Optical Archival Store", *Digest of Papers, Ninth IEEE Symposium*, Nov., 1988, pp. 88–92.
Arneson, D. A., "Mass Storage Archiving in Network Environments", *Digest of Papers, IEEE Symposium*, Oct.–Nov. 1988, pp. 45–50.
Hume, A., "The File Motel–An Incremental Backup System for Unix", Summer USENIX '88, pp. 61–72.
Arnold et al., "Automatic UNIX Backup in a Mass Storage Environment", *Proceed. of USENIX Assoc.*, Feb. 1988, pp. 131–136.
Christman, "Experience With File Migration", Los Alamos National Lab Report No. LA-9014, Oct. 1981.
McLarty et al., "A Functional View Of The Los Alamos Central File System", *Sixth IEEE Symposium*, Jun. 1984, pp. 10–16.
Collins et al., "A Network File Storage System", *Fifth IEEE Symposium*, Oct. 1982, pp. 99–102.
Gwatking, Electronics Research Lab Adelaide (Australia), Report No. ERL-0009-TR, Apr. 1978.
Miller, "Direct Access Data Migration System", U.S.-D.A. Report No. USDA/DF-78/016, Mar. 1978.
Johnson, C., "IBM 3850–Mass Storage System", *AFPIS Conference Proceedings*, May 1975, vol. 44, pp. 509–514.
Johnson, C., "The IBM 3850: A Mass Storage System with Disk Characteristics", *Proc. of the IEEE*, vol. 63, No. 8, Aug. 1975, pp. 1166–1170.
Murray, "Document Based on Clustered Files", Thesis, Cornell Univ. Dept. of Computer Science, Ithaca, N.Y., May 1972.

(List continued on next page.)

*Primary Examiner*—Thomas M. Heckler
*Attorney, Agent, or Firm*—Lahive & Cockfield

[57] ABSTRACT

A networked digital data processing system has two or more client devices, a network including a set of interconnections for transferring information between the client devices, at least one of which has a local data file storage element for locally storing and providing access to digital data files arranged in one or more client filesystems. A migration file server includes a migration storage element that stores data portions of files from the client devices, a storage level detection element that detects a storage utilization level in the storage element, and a level-responsive transfer element that selectively transfers data portions of files from the client device to the storage element.

26 Claims, 4 Drawing Sheets

OTHER PUBLICATIONS

Miller (1988) "A Reference Model for Mass Storage System".

Epoch Systems, "Epoch Systems to Announce New Generation of High Capacity File Servers for Networked Workstations" (Press Release), Sep. 9, 1988.

Epoch Systems, "Epoch Systems Introduces Highest Capacity Storage Server for Technical Workstation Networks" (Press Release), Nov. 10, 1988.

Schnatmeier, "Epoch Delivers Mass Magnetic/Optical Storage for Workstations" UNIXWORLD, Dec. 1988.

Verity, "A 30-Billion-Byte Library For Workstations," Business Week, Oct. 31, 1988.

Neubarth, "Optical, Magnetic Storage Connected in 68020 Server," Misweek, Oct. 31, 1988.

Glazer, "Libraries of tehcnical information for hire," Electronic Business, Nov. 1, 1988.

Olsen, "Workstations Change Role of File Servers," Computer-Aided Engineering, Oct. 1988.

"Epoch Server Goes Online," Computer Graphics World, Nov. 1988.

Smailey, "Ethernet Storage Server Will Integrated Drives," Digital Review, Nov. 7, 1988.

Wilkinson, "Epoch Unveils New Mass Storage Server," Unix Today.

"Epoch Systems Markets Departmental File Server," Electronic News, Nov. 14, 1988.

Anthes, "Epoch Claims Its Data File Server Offers Most Storage," R & D Magazine, Nov. 1988.

"Storage Server Combines Magnetic and Optical Drives," ESD: The Electronic System Design Magazine, Nov. 1988.

"Epoch Server Goes Online," Computer Graphics World, Nov. 1988.

"Big Stuff," Unix Review, Dec. 1988.

"New Products—Systems—Data storage," Computerworld, Dec. 12, 1988.

Kelly, "Epoch-1 Handles 150 GBytes," Digital News, Dec. 12, 188.

"Magnetic-Optical Workstations," Mini-Micro Systems, Dec. 1988.

Willett, "File server meets UNIX need for better storage management," Computer Technology Review, Dec. 1988.

Lieberman, "Hierarchical File Server Puts Archives On-Line," Computer Design, Nov. 15, 1988.

Epoch Systems, "When developers are working on something, they want on-line access to the data, all the time" (Advertising Brochure).

Margolis, "Epoch taking the high road to success," Computerworld (reprinted), Mar. 16, 1989.

Shelef, "Epoch-1—Optical server offers 150 Gb capacity," The Sun Observer, May 1989.

Shelef, "Profile . . . How Thinking Machines uses the Epoch-1 file server," The Sun Observer (reprinted).

DiDio, "Server Offers Optical and Magnetic Disks," Network World, Oct, 9, 1989.

Epoch Systems, "The Epoch server reduced the time needed to retrieve a data film from hours or days to 15 or 20 seconds," (Advertising Brochure).

Johnson, "Twin Peaks: Looking good so far–Up-and-comer Epoch taking off," Computerworld (Reprinted), May 14, 1990.

"Renaissance Migration Technical Summary," Epoch Systems, Revision 3.1, May, 1991.

McGee, "Epoch Combines Magnetic Optical Drives," Computer System News, October 31, 1988.

Epoch Systems, "Epoch Systems to Develop New Generation of High Capacity Film Servers for Networked Workstations" (Press Release), Mar. 14, 1988.

Epoch Systems, "Order Acknowledgement," Dec. 16, 1988, Epoch Systems Inc.

Epoch Systems, "Invoice," Dec. 16, 1988, Epoch Systems Inc.

GTE Directories Service Corporation, "Invoice," Dec. 16, 1988.

Gwatkins, "An Efficient Appolication of Disk Storage to the DRCS Data Migration Scheme," Department of Defense Technical Report, 1978.

Johnson, C. "The IBM 3850: A Mass Storage System with Disk Characteristics," Proc. of the IEEE, vol. 63, No. 8, pp. 1166–1170, Aug. 1975.

NETWORK FILE MIGRATION SYSTEM

BACKGROUND OF THE INVENTION

This invention relates generally to digital data processing, and, more particularly, relates to systems for efficient writing, storage, and retrieval of data in local area networks (LANs) utilizing file servers.

The use of storage-intensive computer applications such as high-performance, high-resolution graphics has grown significantly in recent years, with indications that it will continue to grow through the next decade. Fueling user demand has been the introduction of lower cost 32-bit workstations and an increase in the base of applications software available for those systems. Because of their computational and graphics power, these workstations are employed in data-intensive applications such as electronic publishing, computer-aided design (CAD) and scientific research.

Paralleling these developments has been the emergence of industry standard communication protocols which permit users to operate in a multi-vendor environment. Each protocol defines the format of messages exchanged between devices in a network, such that the devices cooperatively execute selected operations and perform given tasks. In particular, file access protocols permit at least two machines to cooperate with a file server. The file server stores files and selectively enables remote client devices to read and write these files.

One such protocol is the Network File System (NFS) protocol, developed by Sun Microsystems, which allows users to share files across a network configuration such as Ethernet. It is most frequently used on UNIX systems, but implementations of NFS are utilized on a wide range of other systems. The NFS protocol can be described as a request-response protocol. More particularly, it is structured as a set of interactions, each of which consists of a request sent by the client to the server, and a response sent by the server back to the client. Generally, the response indicates any errors resulting from processing the request, provides data sought by the request, or indicates that the request has been completed successfully. Requests are reissued by the client until a response is received. A response which indicates that a request has been performed is referred to as an acknowledgement.

All fileservers and most workstations on modern networks are configured with local disk storage, and consequently all fileservers and most workstations experience a variety of storage management problems. Probably the most pervasive of storage management problems is lack of sufficient free space to accommodate users' working sets of active files.

The term "working set" was first used in the context of virtual memory, where it refers to the amount of physical memory required by an application to execute during a limited period of time. If a computer does not have enough physical memory to accommodate an application's working set, performance degrades because the system incurs excessive overhead while swapping virtual pages of memory in and out of physical memory. In contrast, if the system has an adequate amount of physical memory, then performance is good because each page of virtual memory is more likely to be loaded in physical memory when it is needed.

The same concept applies to files. If a user's local disk has sufficient storage capacity to hold those files that the user is likely to need over the course of, say, one month (that is, his working set of active files), then the user's productivity will rarely be affected by having to wait for a file to be made accessible. But, if the local disk does not have enough room for the active files, then files must in effect be swapped to and from archival storage to make more room. Typically, users' disks are occupied by inactive files—those not part of the working set—so that insufficient space is available for the local set.

More particularly, up to 80% of the network's disks are occupied by inactive files that have not been referenced in over 30 days. This happens in spite of the fact that the size of each user's working set of active files remains fairly stable over time, because inactive files steadily accumulate and there are no tools to efficiently manage that accumulation of inactive data.

Several serious effects are caused by the chronic shortage of storage for active files. In particular, significant time is spent archiving files. Space is made available in small quantities in filesystems scattered around the network. Consequently, new files tend to be scattered randomly around the network instead of being located where they can best serve their users. This severely degrades network performance. Files that get archived are often lost because traditional archiving methods are primitive and lack the ability to easily locate and restore old files. New disks and fileservers are constantly being added to the network. In addition to the cost of acquiring the additional equipment, each new piece of equipment must be managed. In particular, the task of backing up the network's servers and workstations becomes very difficult. Each new piece of equipment adds complexity and reduces the overall reliability of the network.

To be a viable solution, a storage system must satisfy several requirements. For example, the system must be automatic. The cost of manually managing distributed storage quickly exceeds the cost of acquiring the storage. This, coupled with the reality that most network management staffs are severely shorthanded, dictates that the degree of manual intervention must be minimized. Also, the mechanism must reduce the network backup problem.

Moreover, the system must be transparent to users and to applications programs. Users must not be exposed to the fact that some of their files have been physically migrated to archival storage. From the user's perspective, all files must remain logically in place at all times. From the perspective of applications programs, changes to the programs must not be required to accommodate the storage system.

The system must be efficient, in that it does not degrade network performance, and does not degrade the performance of the servers and workstations being managed.

The system must also be accurate. A critical requirement is that a system's scarce, expensive, high-performance local storage be available for the data most suited to it—i.e., the active data. Only demonstrably inactive files should be moved to archival storage.

Moreover, the system must be scalable, in order to provide a solution for the networks most in need of a solution: the large networks with many gigabytes of data distributed across many clients. The system should also be portable to a heterogeneous set of platforms; and reliable, in that the data that are moved to on-line archival storage must be protected against destruction, so that it remains safely available for many years.

It is thus an object of the invention to provide improved network storage management systems that provide unlimited on-line storage for client filesystems on a network.

It is another object of the invention to provide such systems that are transparent to users and applications programs, and which automatically operate with the characteristics of magnetic disks in conjunction with user's existing or native filesystems without necessitating changes.

A further object of the invention is to provide such systems having automated and effective backup and file restore functions.

Other general and specific objects of the invention will in part be obvious and will in part appear hereinafter.

SUMMARY OF THE INVENTION

The foregoing objects are attained by the invention, which provides a system for managing file storage in a network including client devices and client filesystems. The client devices can include at least one local file server or at least one local single-user processing element, such as a workstation, each having a local data file storage element. The client devices are coupled to each other by a set of controllable interconnections forming the local network.

In one aspect of the invention, the file storage management system includes a migration file server, in communication with the local network, having a migration storage means for storing data, and a first file transfer element for transferring the data portion of selected data files from any of the client filesystems to the migration storage means.

The client filesystems establishes at least one file directory containing an entry for each file stored in an associated client device. After transfer of the data portion of a given file, the file transfer element maintains the directory entry for that file in the directory, so that files transferred to the migration storage means continue to be logically present in the directory associated with the client device from which they were transferred, and so that an application program operating in a client device will operate upon the transferred file as if the file were still present in a local storage element, with all client operating system commands operating upon the transferred file as if the file were still present.

The migration file server also includes a second file transfer element, in communication with the migration storage element, for transferring the data portion of selected files stored in the migration storage element to a local storage element associated with a requesting client device, in response to a file access request signal asserted by the client device.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Glossary

The following terms are utilized in describing the invention:

Bitfile—An uninterpreted stream of bytes containing the staged-out portion—i.e., the data portion—of a file on the migration sever. A bitfile contains no file name or file type (attribute) information.

Client Store—A collection of bitfiles from one or more filesystems on client devices. As discussed below, a client store can be designated for exclusive ownership by one client.

Client Device—A workstation or file server that requests file migration (bitfile) service from a migration server constructed in accord with the invention.

Migration Server—An apparatus constructed and operated in accord with the invention, as described hereinafter, to provide file migration (bitfile) service to a set of client devices and client filesystems.

Staging—When a file is staged, its data is transferred from one level to another in the data storage hierarchy described below. A stage-out moves the data to the next lower level in the hierarchy, for example, from magnetic disk to optical disk, or from optical disk to tape. A stage-in moves the data to the highest level in the hierarchy, for example, from optical disk to magnetic disk, or from tape to magnetic disk. In each case, the file's directory information, referred to herein as the inode, remains on magnetic disk, and the pointers to the file's data are modified to reference the data's new location in the hierarchy. In accord with the invention, because the directory information remains on magnetic disk, the file remains online, logically in place, and can be referenced at all times.

Overview

Figure 1:
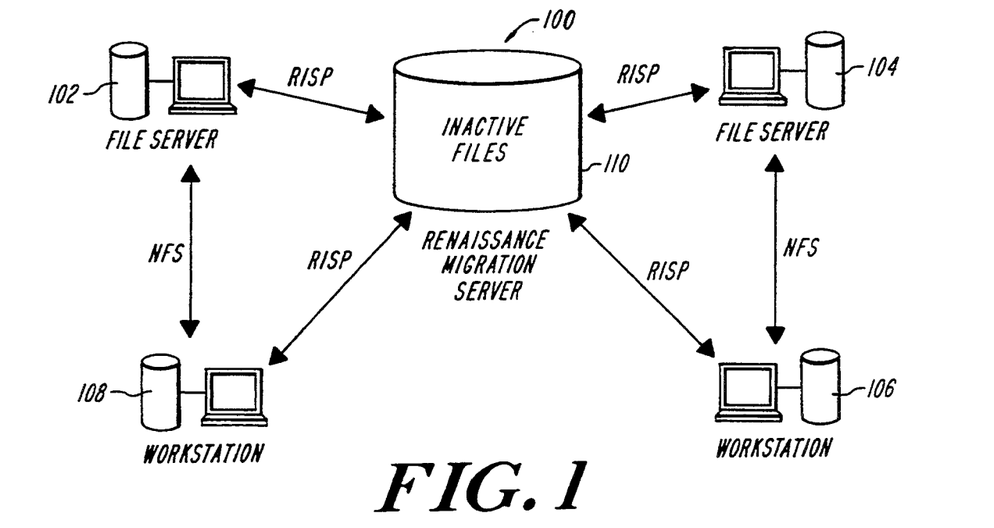
FIG. 1 is a schematic diagram depicting a network storage system constructed in accordance with the invention, showing a set of local file server clients and workstation clients in communication with the migration file server.

FIG. 1 is a schematic diagram depicting a network storage system utilizing a migration file server constructed in accordance with the invention. The system 100 includes a set of local file server client devices 102, 104, and workstation client devices 106,108 in communication with the migration file server 110. As indicated in FIG. 1, client systems serviced by the migration server 110 can either be local fileservers or individual workstations. The migration file server 110 utilizes an architecture and protocol discussed hereinafter to enable efficient migration server/client communication, and rapid staging or transfer of files to and from the migration server.

A migration server constructed and operated in accordance with the invention must satisfy two fundamental requirements. First, the migration server must have sufficient capacity to hold on-line an appropriate window of network archival data (e.g., at least six months of data). Secondly, the server must operate in accordance with the migration protocol described below to provide transparent file migration while allowing each client to utilize its existing filesystem. The migration file server 110, in one practice of the invention, is an EPOCH-1 InfiniteStorage TM Server, manufactured by Epoch Systems, Inc. of Westborough, Mass., operating in accordance with the migration protocol described below. Because of its transparent integration of high-speed magnetic disks with economical, high-capacity optical storage, the Epoch-1 InfiniteStorage server is ideally suited to function as a migration server.

Features of the Epoch-1 InfiniteStorage server are described in commonly-owned, co-pending U.S. patent applications Ser. Nos. 454,066, now U.S. Pat. No. 5,276,867, issued Jan. 4, 1994, 452,960, now U.S. Pat. No. 5,276,860, issued Jan. 4, 1994, and 475,368, now U.S. Pat. No. 5,218,695, issued Jun. 8, 1993, the teachings of which are incorporated herein by reference.

Referring again to FIG. 1, in accordance with the invention, the migration server controls migration to and from local storage elements, including local disks on fileservers and workstations, so that the client existing filesystems and local storage elements act as a cache that contains recently accessed files. As that cache fills up, the migration server uses the protocol described below and in the attached Appendix A which can be found in the application file to move the least active files to the migration server. Directory information is kept on the local disks and all files always appear to remain logically in place on the local disk, even after their data have been physically migrated to the migration server. When a migrated file is read or written, its data are automatically moved from the migration server back to the local disk. This feature is referred to herein as distributed hierarchical storage management.

By enabling client devices to utilize their existing, or native, filesystems, the invention maintains filesystem features that client operating systems and applications programs depend upon. This permits users to exploit new developments offered by filesystem vendors, without the necessity of migration-imposed changes to the filesystems.

The invention exploits the fact that most users working sets of active files remain relatively stable in size over time. In order to reliably ensure that sufficient storage element capacity exists to store the network's active files, the invention provides methods and apparatus for identifying inactive files and automatically moving them to economical archival storage. Techniques for identifying such files, in nondistributed server systems, are described in commonly-owned, copending U.S. patent applications Ser. Nos. 454,066, now U.S. Pat. No. 5,276,867, issued Jan. 4, 1994, 452,960, now U.S. Pat. No. 5,276,860, issued Jan. 4, 1994, and 475,368, now U.S. Pat. No. 5,218,695, issued Jun. 8, 1993, the teachings of which are incorporated herein by reference.

The invention provides a number of important features to users of the client systems, as discussed in greater detail hereinafter. In particular, the migration server enables the filesystem to function as a magnetic disk system having unlimited capacity, by providing configurable, per-client filesystem utilization levels, referred to as watermarks, which define a band of utilization for each filesystem. The low watermark defines the level to which filesystem utilization is automatically reduced periodically. This assures, for example, that each user begins each day with a configurable amount of free space. The high-watermark defines a maximum utilization level that the filesystem is allowed to reach before the system automatically begins to make more space available.

The migration server thus provides periodic bulk migration to the migration server from each filesystem managed by the migration server, to bring filesystem utilization down to the low watermark. A system administrator can schedule the periodic, bulk staging run for off-peak hours to minimize its effects on the network's users.

The migration server provides automatic, on-demand file migration to the migration server from each filesystem managed by the migration server to create more available space on client filesystems when utilization reaches the high watermark. When this occurs, user applications merely pause until more space available, instead of aborting with a "DISK FULL" message.

The migration server provides automatic on-demand retrieval of the data portion of files that have been staged out to the server storage when the file is read or written. This retrieval is transparent to users and applications, and the files are retrieved across the network at once to the local disk.

In addition, the migration server also provides procedures that permit specific files to be explicitly staged out; utilities that allow the attributes of migration server-stored files to be displayed and changed; and novel versions of the Berkeley backup procedures DUMP and RESTORE, which enable users to back and restore files in filesystems managed by the migration server.

The migration server also provides a method for efficient stage-in of multiple files; a mechanism for allowing multiple clients to view and access files in a single filesystem; and a protocol for network data communication.

The invention also provides storage management utilities on the migration server for creating, deleting, configuring, and moving client stores—i.e., the storage areas on the migration server that contain client files that have been migrated from the client system.

Client Stores

Figure 2:
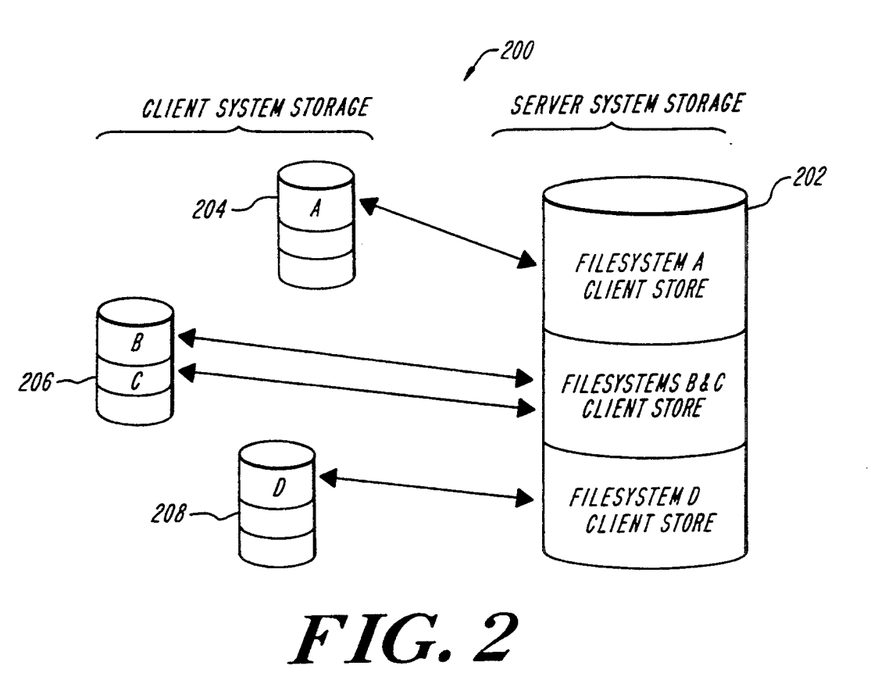
FIG. 2 is a schematic diagram depicting the mapping of data from client filesystems to areas of server system storage referred to as client stores.

FIG. 2 illustrates the mapping between client filesystems and client stores in the magnetic storage of the migration server. As illustrated in FIG. 2, in accord with the invention, the data from files that have been migrated from each client are organized into one or more client stores on the migration server. In one practice of the invention, a client store can be designated for exclusive ownership or exclusive access by the client that owns it.

Data from the clients' files are stored in the client store as bitfiles. Bitfiles are a stream of bytes having meaning only to the client systems. The bitstream is not interpreted by the server. In a current practice of the invention, the bitfiles represent the contents of UNIX files. However, future client implementations could, for example, use bitfiles to store units of data from a database or from any other operating system.

When a process operating on a client wishes to read or write an object that has been migrated to the migration server, it requests the object by passing the bitfile identification (hereinafter "bitfile id") to the server. The server returns the bitfile to the client. The client has no awareness of any details about how the bitfile is managed by the migration server. It is the responsibility of the client software to keep the association between the bitfile's id and the actual contents of the bitfiles.

There are several ways to arrange client stores on the migration server storage. Client stores are directories, not separate filesystems. Hence there can be multiple client stores in one filesystem. If the server is being used for both NFS and migration service, it is desirable to place the migration client stores in a separate filesystem from the NFS filesystems. That way, the client store data cannot be exported and the client stores can have separate staging trails from the NFS filesystems to reflect their different properties. If the migration server is an Epoch-1, it might be desirable for different sets of clients stores to stage to their own sets of optical cartridges. This is achieved simply by segregating unrelated client stores in separate filesystems and configuring those filesystems to stage to separate staging trails. This should be done, for example, if it is anticipated that one set of client stores may one day be moved to a different Epoch-1 server.

As noted above, in one practice of the invention, each client store has one and only one client system owner. Only those migration processes controlled by the originating client system are permitted to read or write the client store.

Migration Protocol

Figure 3:
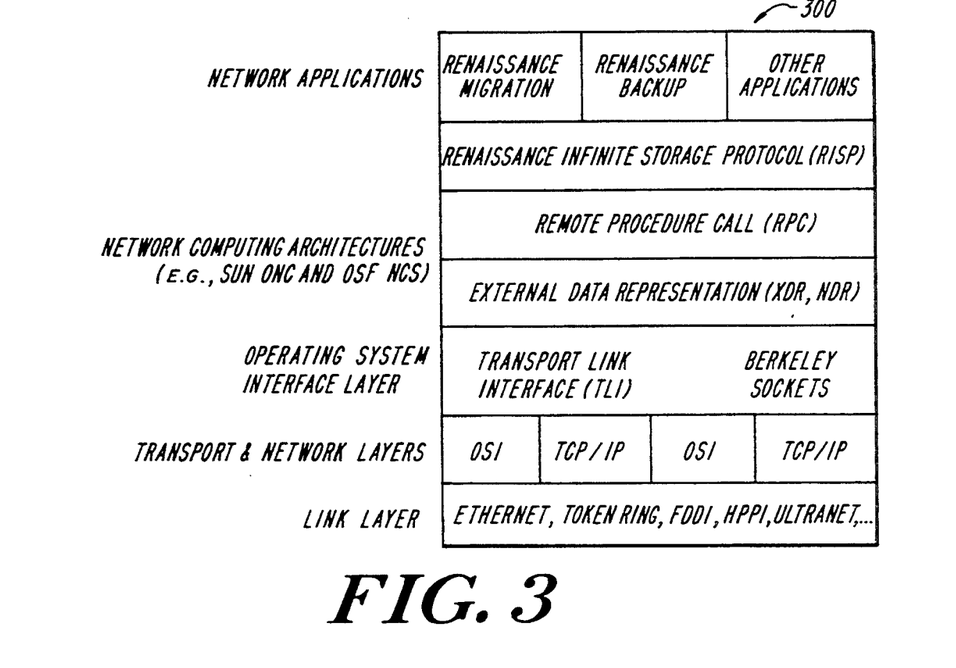
FIG. 3 is a schematic diagram depicting the relationship between the network storage management procedures and the other layers of the network system.

As noted above, the migration server uses a novel protocol, referred to herein as the Renaissance Infinite Storage Protocol protocol, to create and access bitfiles on the server. The RISP protocol is designed to provide a bitfile service that can be used with many types of client systems, including systems running non-UNIX operating systems. FIG. 3 indicates that the RISP protocol is a remote procedure call protocol that uses the Sun RPC/XDR protocols on top of TCP/IP. The RISP protocol does not use NFS. However, an Epoch-1 server, operating in accord with the RISP protocol described herein, can provide both NFS service and the migration service simultaneously.

Figure 4:
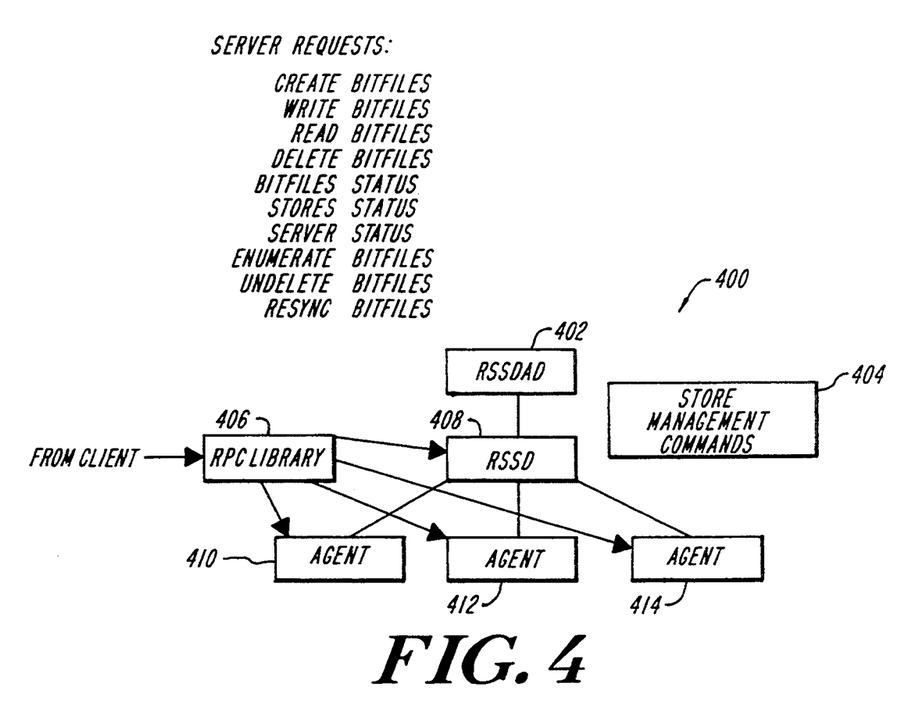
FIG. 4 is a schematic diagram depicting the various processes that are executed by the migration file server in accord with one practice of the invention.

The RISP protocol is designed specifically to provide transnetwork access to a bitfile service on the migration server. The basic operations provided by the protocol, as indicated in FIG. 4 and discussed in greater detail in Appendix A, are as follows:

CREATE BITFILE: As noted above, a bitfile is a stream of uninterpreted bytes. This operation creates a bitfile on the server and returns a unique bitfile ID to the client. The client is responsible for maintaining the association between this bitfile ID and the file on the client. A CREATE BITFILE request can also contain data to be written to the bitfile. For a small file, the entire bitfile can be created and written with one request.

WRITE BITFILE: Writes a stream of bytes to a previously created bitfile.

READ BITFILE: Reads a stream of bytes from a previously created bitfile.

DELETE BITFILE: Deletes a bitfile. The client uses this to delete the staged-out portion of a file that is deleted on the client.

UNDELETE BITFILE: Tells the server to recover from the server a bitfile that has been deleted by a DELETE BITFILE procedure. It may require recovery of the bitfile from the server's backup of the filesystem containing this bitfile's client store. The client uses this to restore the staged-out portion of a file that is restored on the client. The migration server re-establishes the connection to that recovered bitfile without requiring connection to the client.

GET SERVER STATUS: obtains information about a migration server.

GET BITFILE STATUS: obtains information about a particular bitfile, including whether it is backed up on the server.

GET CLIENT STORE STATUS: obtains information on a particular client store, such as the maximum size bitfile that can be created on this client store.

ENUMERATE BITFILES IN A STORE: obtains a list of all bitfile IDs in a client store.

RESYNC BITFILE: indicates to the server at what point in a bitfile the client will resume writing data for that bitfile. The client can set a synchronization point with a WRITE BITFILES request, requiring that all data written to that point be committed to non-volatile storage. Then, if the server or network goes down, the client can resume writing the bitfile with a RESYNC BITFILE request.

Stage-In

As indicated in FIG. 4, the implementation of the migration server processes, which resides at the user-level, consists of a server daemon to handle incoming connection requests from multiple clients; agent processes to handle protocol requests for specific client stores; and utilities to manage client stores, including CREATE, DELETE, and MOVE.

Figure 5:
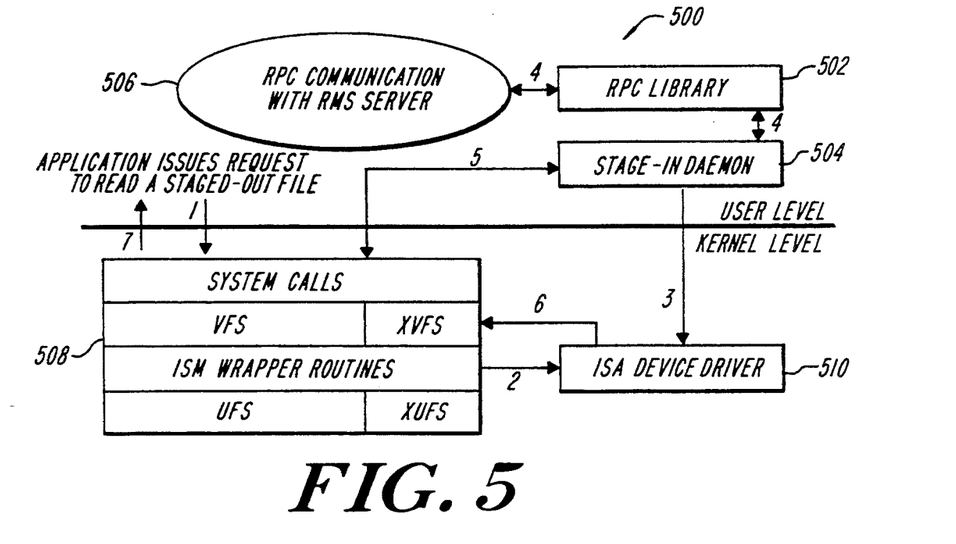
FIG. 5 is a schematic diagram depicting file stage-in operations for a client device.
Figure 6:
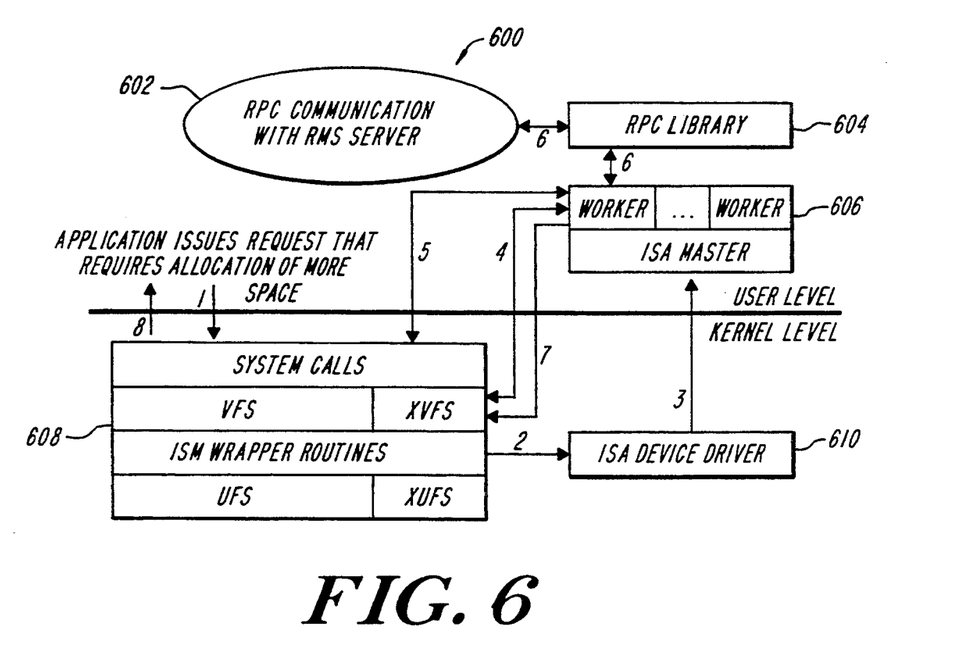
FIG. 6 is a schematic diagram depicting demand-driven file stage-out.

FIGS. 5 and 6 depict stage-in and stage-out transfer operations executed in accordance with the invention. These operations are referred to herein as file migration. An important feature of the invention is that no changes are made to the client filesystem inode structure to support the migration protocol.

Each inode in a filesystem managed by the migration server has a collection of new information that must be maintained by the client software. This includes the STAGED BITFILE ID and information that affects how the migration server handles the files associated with the inode. For example, the system utilizes a digital flag indicating that a given file must be "locked down" and never staged out. However, this information is not kept in the inode itself. Instead, in each filesystem managed by the migration server, the server creates a separate file referred to as the EPXATTR file. This file contains one entry for each inode. The entry contains the BITFILE ID and a set of attributes, known as extended migration attributes, for the file. The use of the EPXATTR file insures compatibility with future operating system releases which may implement inodes differently.

FIG. 5 depicts a typical stage-in operation. The VFS and UFS modules are client operating system modules and are unchanged. When a file is accessed, a "wrapper" or "intercept" routine is executed. Wrapper routines are procedures that are called before each UNIX File System (UFS) routine is called. The wrapper procedures provide two functions. First, if necessary, they stage-in the file being acted on. Secondly, the wrapper procedure acts upon "no space" filesystem errors by blocking the operation until the migration server makes space available on the client device. Each wrapper procedure calls an appropriate UNIX filesystem routine after these tasks are performed.

Referring again to FIG. 5, during a typical stage-in operation, a READ wrapper routine detects that a file access request is being asserted by an element of the client device filesystem. The wrapper procedure then tests whether the file being acted upon has been staged-out. The procedure determines whether the file is staged-out based upon the quantity of magnetic space used (from the inode) and the presence of a non-zero staging ID (in an EPXATTR file entry). The following steps are then executed to implement the stage-in operation:

1) An application on the client system issues a request to act upon a staged-out file, for example, to READ the file.
2) The wrapper calls a routine in the ISA device driver, and then blocks execution of the READ until the entire file is available.
3) The ISA device driver posts a stage-in request which is read by the daemon.
4) The stage-in daemon gets the associated staging ID from the stage fault information. It makes one or more RPC requests to the server to read the associated bitfile. The server finds the bitfile from the staging id and responds with the bitfile data.
5) The stage-in daemon creates a temporary file containing the staged-in data and notifies the ISA device driver of the completion of the stage-in.
6) The ISA device driver switches the block maps so the temporary file's blocks are now the real target file's blocks.
7) The original operation can now proceed.

At this point, there is a version of data in the client filesystem, and a version on the migration server. The version in the client filesystem is referred to as the true original version. The version in the migration server is retained. If the file is subsequently staged-out, the copy on the migration server is used. Data transfer is not required if there were no modifications to the true original version since the original transfer was executed.

The migration server also provides a procedure for efficient bulk stage-in of data. The migration server orders, or sorts, the transfer of the data portion of files based upon the location of the bitfiles on the physical media—i.e., the disk volumes—upon which they are stored in the migration server.

Stage-Out

FIG. 6 shows a typical on-demand stage-out operation. A demand staging operation includes the following steps:

1) An application on the client issues a filesystem request that requires additional space to be allocated.
2) The wrapper routine detects a low space condition and calls a routine in the ISA device driver to report it. If there is no space available in the filesystem, the wrapper blocks the operation until space is available. If some space is available, the operation proceeds immediately, in parallel with the other steps.
3) In either event, the ISA device driver sends a "no space" fault to the ISA master.
4) The ISA worker for that filesystem reads inodes to select the best least-recently-used candidates for stage-out.
5) The ISA worker reads each file to be stage out.
6) The ISA worker issues one create bitfile and one or more write bitfile protocol requests for each file staged out (these requests can be hatched).
7) The ISA worker records that this file is staged out to this bitfile ID, and the storage space on magnetic disk upon which the data portion was stored is released.
8) When enough space is available, the original operation proceeds.
9) Stage-out and release of storage space continues until the low watermark is attained.

In periodic stage-out, the utilization level is checked to determine whether it exceeds the low watermark. If it does, steps 4, 5, 6, 7 and 9 are executed without releasing magnetic space, until utilization has attained a selected pre-stage reserve level that is lower than the low watermark. This enables client devices to continue to operate upon the selected files, and enables the immediate release of local storage space utilized by the pre-staged files if storage levels exceed the high watermark.

Both the on-demand stage-out and the periodic stage-out processes test for pre-staged data before proceeding. Files that have been pre-staged have the highest priority for stage-out. Thus, on-demand stage-out can quickly create space by completing stage-out of pre-staged data.

A further optimization of stage-out is referred to as a "fencepost" technique. In accord with this aspect of the invention, the migration server can be configured to retain a selected quantity of data in local storage, after transfer of the data portion. In particular, the server does not release the local magnetic space that stores the selected quantity of data. The selected quantity of data, referred to as a "fencepost", enables rapid access on subsequent reference. It also satisfies the access requirement of certain common utilities without requiring stage-in. In conjunction with this technique, the migration server maintains a record of whether the fenceposted file has been modified after transfer.

Comparison with NFS

Figure 7:
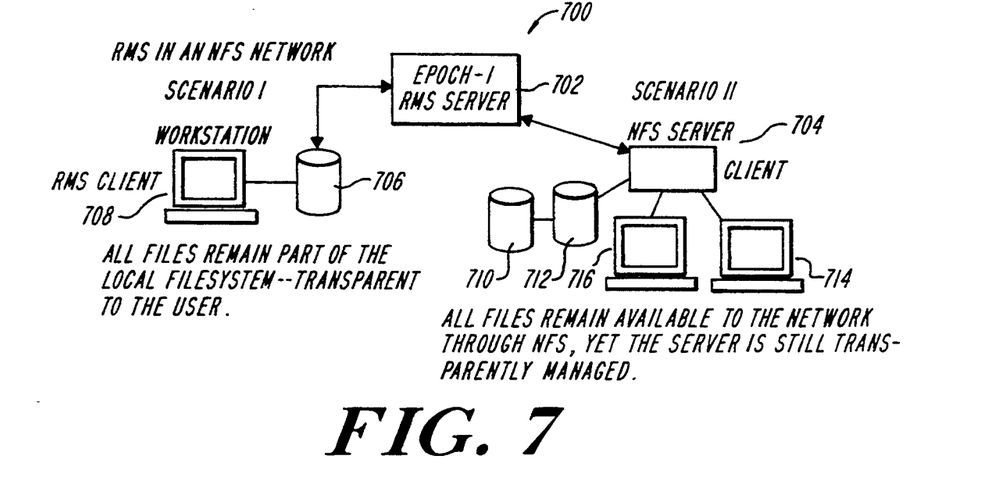
FIG. 7 is a schematic diagram depicting the relationship between an NFS network and the storage management system of the invention.

FIG. 7 depicts a migration server operating in accordance with the invention, providing migration services to client devices operating within an NFS network.

Those skilled in the art will appreciate that NFS and the migration features by the invention are separate and distinct services. The migration procedures and apparatus described above manage filesystem storage so that the filesystem storage elements never fill to capacity. However, the migration server does not control the sharing of files between multiple clients. File sharing is provided by NFS. If a file is to be shared, the other systems requiring the file must access it by mounting the filesystem via NFS.

In NFS, all files always physically reside on a particular NFS file server. The NFS clients do not have locally cached copies of these files. They may have blocks from the file cached in their local memory, but there is no cached copy of the file on the local client disk. This means that, except for the blocks that happen to be cached in client buffers, the client must always communicate with the server to read or write the blocks of the file. It also means that when a file is written, the server must not acknowledge the operation until it has physically written the blocks to the file. That is because a rule of the NFS protocol is that an NFS write must be committed to non-volatile storage on the server before the write request can be completed on the client.

In accord with the invention, however, the true original copy of active files physically reside on local client storage, but even inactive files remain part of the local filesystem after their data have been migrated. A file may exist only on local storage and not on the migration server at all—especially if it has just been created or is modified frequently—but all active files are retained on the local disk for fastest access. As a result, successive accesses to the file do not require remote access as the traditional NFS methods of remote files do. This means that writes operations are executed more quickly, because local disk writes are faster than NFS writes. Also, because access to the active files requires no communication with the server, network traffic and server load is greatly reduced.

Another difference between NFS and the migration services provided by the invention is that files managed by the migration server remain logically in place in the client system. In contrast, with NFS, the user must remotely mount the required filesystems. This requirement adds significant overhead to complex networks. Thus, if client systems do not need to share files, but merely require more space, the migration server provides a simpler solution than NFS.

Moreover, as noted above, the migration server uses a special remote procedure call protocol built upon RPC/XDR and TCP/IP. NFS, in contrast, utilizes UDP/IP procedures.

The migration server procedures and NFS operations are compatible, however, and as indicated in FIG. 7, the migration server can provide storage management for the NFS filesystem. The NFS file server depicted therein is a client of the migration server. In that configuration, the NFS server files can be shared between multiple clients, while at the same time the migration server manages the NFS server filesystems so that they do not fill to capacity. The users sharing the NFS server files will be unaware that the NFS server filesystems are being managed by the migration server. The NFS server filesystems are then clients of the migration server.

While FIG. 7 depicts the utilization of a separate NFS server, those skilled in the art will appreciate that a single Epoch-1 InfiniteStorage server can simultaneously provide both NFS services and migration services.

One Embodiment of an Apparatus According to the Invention

Figure 8:
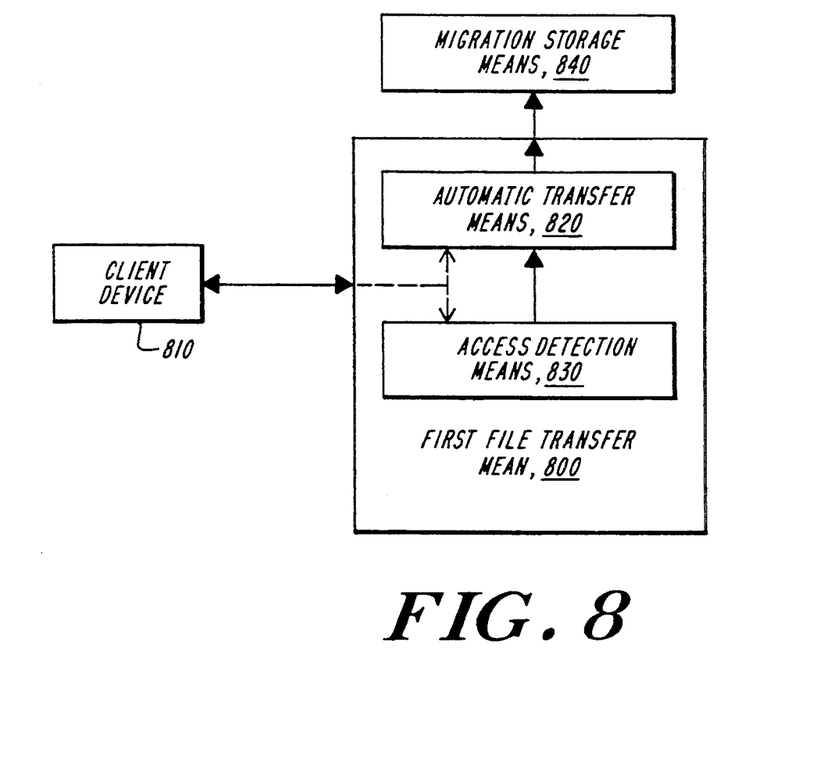
FIG. 8 shows an apparatus for transferring data from the client device to the migration storage means according to the invention.

FIG. 8 shows an apparatus for transferring data from the client device to the migration storage means according to the invention. FIG. 8 shows first file transfer means 800 in communication with a client device 810. First file transfer means 800 includes automatic transfer means 820 and access detection means 830. First file transfer means transfers data from client device 810 to migration storage means 840. Access detection means and automatic transfer means operate to transfer the least-recently-accessed files to migration storage means 840.

Migration Server Implementation for Sun Platforms

The client portion of the migration protocol has been tested in connection with the Sun-3 and Sun-4 (SPARC) family of workstations and file servers. The client software consists of new and modified commands and new object files, which must be linked with the standard SunOS kernel to build a new kernel.

There are two sets of enhancements to the client device kernel that are made when the migration server is integrated into the network. One is the ISA device driver, which is a pseudo-device driver used to communicate with the ISA utilities and the stage-in daemon. The other is a set of routines referred to herein as wrapper routines. These routines are called first via the Virtual File Switch for every access of the UNIX File System (UFS). Integrating the migration protocol to the system's kernel requires that the kernel be rebuilt, in a manner similar to adding any other device driver. This is a conventional and common practice of network users. The wrapper routines do two jobs. First, they detect when a requested file is staged-out and must first be retrieved before the standard UFS routine can be called. Second, they detect "no space" errors and start the process that will stage-out files to make space available. They block the request requiring more space until it is available and make sure that "no space" errors are not returned to the user. Once space is available, the standard UFS routine is called.

The file system inode structure is not changed, and unused portions of the standard inode are not used, in order to avoid requiring filesystem reconfiguration when the migration protocol is installed on a client system. Instead, the bitfile ID and other extended file attributes (e.g., LOCK FILE onto local client storage) are kept for each inode in a separate file referred to as the EPXATTR file. An EPXATTR file exists in each filesystem managed by the migration server. This file is created when the filesystem is initially placed under control of the migration server. The EPXATTR file contains an entry for each inode in the filesystem. If the staging ID or other extended attributes are needed, the EPXATTR entry for the inode in the file is read.

The wrapper routines quickly determine whether or not a filesystem for which a file access request is asserted is managed by the migration server. If it is not managed, the wrapper routine immediately calls the standard UFS routine. In one practice of the invention, for filesystems managed by the migration server, the wrapper routine checks the NUMBER OF BLOCKS field kept in the inode. If it is non-zero, the file is resident on local storage and the UFS routine is immediately called. If the NUMBER OF BLOCKS field in the inode is zero, the number of bytes for the file is checked. If this is zero, the file is simply empty, and the standard UFS routine is called immediately. If the number of bytes for the file is not zero, the wrapper routine retrieves the file's extended attributes from the file's entry in the EPXATTR file. Included in those attributes is the file's BITFILE ID, which is used to retrieve the file from the server. Alternatively, a simple FILE STAGED flag could be employed to determine whether a file has been staged.

In a practice of the invention utilizing the "fencepost" technique described herein, the migration server accounts for the fencepost quantity that is locally resident. The test is then whether the number of blocks is equal to the fencepost quantity, and whether the number of bytes for the file is greater than the fencepost quantity.

The following new object files and commands are part of the migration client software on a Sun client:
 1. New kernel objects for wrapper routines and a pseudo-device driver for the ISA (InfiniteStorage Architecture) device. These new objects are linked with existing SunOS objects during migration protocol installation, producing a new kernel.
2. Configuration tools to manage filesystems under ISM control:
CONF_ISM_LIST,
CONF__ISM_SYSTEM,
CONF__ISM_FILESYS, AND
CONF_ISM_STAGING_TEMPLATE.
3. ISMREPORT, a tool that reports ISM statistics.
4. ISM master, ISM workers, and ISM MAKE CANDIDATE list processes that manage filesystems so that storage utilization remains within the configured limits defined by the watermarks.
5. ISA stage-in daemon. This is the utility that stages in files or deletes bitfiles when a staged file is modified.
6. EPDUMP, EPRESTORE, EPRDUMP, AND EPRRESTORE. These are enhanced versions of DUMP, RESTORE, RDUMP and RRESTORE that handle staged-out files.
7. EPTAR.TAR is changed to set the access time to the modification time upon extraction, instead of the time of extraction. The same change was made to TAR on the Epoch-1. A switch is provided to specify the unmodified behavior.
8. EPFSCK. Checks are added to FSCK to verify that the staging attributes of migration protocol-controlled files are consistent, to correct them if necessary, and to otherwise account for staged-out files.
9. EPDU. A switch is added to DU to show the total virtual space, not just the magnetic resident space.
10. EPFIND. A switch is added to find staged out files.
11. EPMOUNT. The MOUNT command is changed to notify the kernel when a migration server filesystem is mounted and to log a warning if a migration server filesystem is mounted when a non-migration-server kernel is running (e.g., the standard SunOS kernel).
12. MAN pages for the above commands. MAN pages for DUMP, RESTORE, TAR, FSCK, DU, FIND, and MOUNT are also replaced with migration server client MAN pages for those commands.
13. Installation and de-installation scripts. These scripts automate the building of kernels and the installation and de-installation of the software on each client.

In addition, the standard Sun commands are saved and replaced with symbolic links to the EP* versions to prevent accidentally using the un-enhanced versions on a system with migration filesystems and to avoid requiring modification or user scripts that use the affected commands. Using standard DUMP, RESTORE, and FSCK on a filesystem managed by the migration server described herein would yield unexpected results. In particular, the standard DUMP does not understand staged-out files and does not check with the server about their backup state, and will incorrectly behave as if it succeeded.

Thus, enhanced versions of the DUMP and RESTORE utilities are provided in connection with the migration server. The default mode of this version of DUMP backs up all information on local client storage (which includes all inode and directory information, plus all non-staged files), plus all staged files that have not already been backed up by the migration server. For each staged out file, DUMP queries the migration server to determine if the associated bitfile has already been backed up on the server. If it has, the file's data is not included in the local dump. If it has not, DUMP reads the bitfile data from the server and includes it in the local dump.

DUMP has two other modes. "Complete" mode dumps all data, regardless of whether it is staged out or not. This is useful for off-site storage and for moving an entire filesystem to another system. "Local" mode dumps only the local storage, regardless of the backup state of the bitfiles on the server. This is used for moving a filesystem to another filesystem on the same client, reattaching the local files to their associated bitfiles on the server.

The default mode of the RESTORE utility will restore a file to its state at the time dump was run. If it was staged out to the migration server, the inode is restored to the client's local disk and the server is requested to recover the bitfile portion. If the file was resident on local magnetic storage at the time of the dump, it is restored to local magnetic storage.

If these enhancements were not present, DUMP would cause unnecessary stage-in of all migrated data, which would far exceed local storage capacity and expend substantial time. If RESTORE was not enhanced as described, far more files than local storage could handle would be transferred to the migration server, causing unnecessary traffic to the migration server, and causing additional copies to be stored on the migration server. Moreover, the FSCK procedure described herein would detect file structures that it cannot process intelligibly, thereby causing incorrect results.

In one practice of the invention, installation and de-installation scripts can be integrated into the client operating system. The scripts automate the building of kernels and the integration of migration server procedures on each client device for a standard SunOS system.

The installation scripts include a provision for instructing the administrator with regard to manually building kernels and installing the software. A BUILD kernel script and a separate INSTALL CLIENT SOFTWARE script permits the administrator of a large network to first build a kernel for each type of system that will be managed by the migration server (e.g., 3/60, 3/80). The administrator will then move these kernels to the client systems and install non-kernel migration server client procedures on each client.

The de-installation scripts are used if the administrator no longer wishes to have a client's storage managed by the migration server. The first step is to move all data from the migration server to other storage. Since the amount of storage needed will likely exceed the client's local storage, this will probably involve copying the files from the client filesystem and staging-in files as needed) to a filesystem on a local fileserver, such as the Epoch-1, which the client can mount via NFS. A script to be run on the client is provided to do this data copy. Another script is provided to de-install the kernel changes and the software on the client.

Typical Applications for Migration Server

The invention can be utilized in many different environments that can to manage network storage more efficiently. These include networks with multiple fileservers, networks with numerous workstations having disk storage elements, and networks requiring high-performance access to large quantities of centrally managed storage.

Many data processing systems utilize a network like that depicted in FIG. 1, with several fileservers and hundreds of workstations that use NFS to access the servers' storage. Prior to the advent of the migration server described herein, a system administrator typically would determine manually which fileserver directories should be moved to the archive server and which should remain on the local file servers from which the files originated. The process of determining which files to transfer, and the actual transfer of the files, was time consuming and prone to error.

The invention addresses the problems of file storage and retrieval in a network by allowing the logical placement of files on the existing fileservers to remain unchanged even as the fileserver disks fill up. The migration server determines for the administrator which files on the servers are inactive, automatically moves these files to a storage element in the migration server, and automatically maintains the most active files on the fileserver's local storage.

As described in detail hereinafter, this processing is completely transparent to the user and to applications programs operating on the client devices.

Most workstations, like those depicted in FIG. 1, have their own disks or other local storage elements. In certain systems, this storage is used only for the ROOT and SWAP partitions, and all user data is kept on file servers. However, at many sites, users maintain their own data on their local workstation disk, in order to improve performance. No matter how lightly a site's network is loaded or how powerful the fileserver is, remote access is rarely as rapid as local access.

However, in the absence of a migration server like that described herein, individual users must manage their own storage manually. When the user's local disk fills to capacity, the user must manually delete or archive files to make more space available. The migration server addresses this problem of local workstation storage sending inactive files to the migration server storage element, so that local storage is never filled to capacity.

The migration server also addresses the issue of generating backup copies of data files. This function, which is vital for efficient workstation storage, is usually executed manually by workstation users or a network administrator. However, by utilizing the migration server, only the active data physically resides on the workstation disk, so backups take significantly less time. Inactive data is physically present on the migration server storage element, where it will automatically be backed up by the server's backup processes, as discussed hereinafter. The migration server also provides enhanced versions of the Berkeley DUMP and RESTORE utilities to efficiently back up files.

In particular, using the migration server, the system administrator can utilize the enhanced version of DUMP to have workstation storage backed up, without considering which files have been moved to the migration server. Although DUMP must still be run on each individual workstation, the process can be automated by using a script that is executed periodically via a scheduler element, such as the CRON facility, and by placing the dump image in an NFS-mounted filesystem in the migration server—for example, the Epoch-1.

Performance Considerations

Each client filesystem should have sufficient total magnetic disk capacity—i.e., local storage element capacity—to store its working set of currently active files, plus a reserve cushion to accommodate additional storage space that will be used each day (or during the period between periodic, scheduled stage-out runs). The reserve cushion should be sufficient to hold new files and temporary files created during the course of a day or other selected time period.

If the client has insufficient disk capacity, "no-space" faults may result, and demand stage-out operations will be required to free up space. Performance will be reduced because no-space faults and demand stage-outs cause the user or application to pause until the operation is completed. The affect would be very similar in nature to a virtual memory computer with insufficient RAM.

The amount of magnetic space required on the migration server is determined by the same factors that affect the space requirements of migration server clients, but on a larger scale. The migration server space requirements for client store filesystems are completely independent of, and in addition to, any magnetic space requirements imposed by also using the migration server as an NFS server.

A migration server filesystem containing a set of client stores should be configured with sufficient magnetic space to handle the client's periodic stage-out runs without filling to capacity. Otherwise, the client's periodic staging runs will cause demand staging to occur on the migration server, and the periodic staging will take longer.

For example, assume that a filesystem managed by the migration server holds ten client stores, and nothing else. Assume also that each of the ten clients stages out an average of 10 MB per day during their periodic stage-out run. Therefore, a total of 100 MB per day will be staged to the migration server. The filesystem on the migration server should then have its watermarks configured to provide 100 MB of free space each day to handle the clients' periodic stage-out runs without causing demand staging to occur.

The clients' periodic stage-out runs would still execute if, for example, the filesystem containing the client stores has only 50 MB available. However, the stage-out runs would require more time because demand staging would have to be performed to make space available to receive the clients' staged files.

Preferably, the migration server scheduler should be configured so that periodic client stage-out occurs first, followed by periodic stage-out of the migration server, which flushes the file systems to tertiary storage, and enables the migration storage elements to receive on-demand stage-out. Periodic client stage-out should occur in a staggered fashion so as to avoid network performance interference between clients.

An important feature of the invention is that a network or server crash will not lose client data. The client system will not remove the magnetic copy of a staged-out file until it is sure that the file has been successfully written to the server. Each write bitfile request includes a synchronization point flag. The client sets this flag when it requires that the server commit the bitfile data to non-volatile storage before responding to the request. It always sets the flag in the middle of staging out a file (this can be useful for large files). If the server crashes or the network goes down during a stage-out, the client waits for the server to respond again. When the server responds, the client restarts the stage-out operation at the last known synchronization point. This may mean restaging the entire file, if no synchronization point was set. Only when the server responds that the file has been committed to nonvolatile storage will the client save the associated staging ID for the file and release the file's magnetic blocks.

Conclusions

It will thus be seen that the invention efficiently attains the objects set forth above, among those made apparent from the preceding description. In particular, filesystems on client workstations and file servers managed by the migration server do not fill to capacity. This permits users to place files onto systems where they will be used most often, without regard to the storage limitations of those systems. The filesystem's directory name space is maintained on the client system, so that the user need not be aware of whether files have been staged to the migration server.

In addition, frequently used files are stored on local disks for fast access. The server utilizes a least recently used procedure to determine which files should be staged-out. As a result, active files stay local, so that their access requires no server interaction or network traffic. Filesystems that are not full are less fragmented and provide enhanced performance.

The invention also provides lower cost storage. In most networks, a large percentage of all storage has not been accessed recently. The migration server automatically migrates these inactive files to lower cost archival storage on the migration server. The files remain on-line, but their cost of storage is less.

The migration server also provides distributed network storage with centralized administration. Using the invention, networks can be constructed with distributed storage to improve performance and eliminate a single fileserver point of failure, while the entire network's storage is centrally managed and administered. File migration and archiving of inactive data occurs automatically.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A networked digital data processing system comprising
A. two or more client devices,
B. a network comprising a set of interconnections coupled to said client devices for transferring information therebetween,
C. at least a selected one of the client devices having a local data file storage element for locally storing and providing access to digital data files arranged in one or more client filesystems,
said local data file storage clement including, for each such filesystem, at least one file directory containing an entry for each data file stored in that filesystem,
D. a migration file server, coupled to client devices through said network, including
  (i) migration storage means, coupled to said network, for storing at least data portions of data files from said selected client device,
  (ii) storage level detection means, coupled to said local data file storage element, for detecting a storage utilization level therein,
  (iii) level-responsive transfer means, coupled to the storage level detection means and with said migration storage means and with said local data file storage element, for responding to storage utilization level exceeding a selected high watermark level for transferring data portions of one or more data files from such local data file storage element to the migration storage means, and
  (iv) said level-responsive transfer means further including means for effecting release, by said local data file storage element, of storage space previously occupied in that local data file storage element by those one or more data files.

2. A networked digital data processing system according to claim 1, wherein the migration file server includes dump means for generating a local backup copy of data file, or data portions thereof, stored in any of said local data storage element and said the migration storage means.

3. A networked digital data processing system according to claim 2, wherein the dump means includes means for
  (i) determining whether a given data file has been transferred to the migration storage means, and responding to a negative such determination for generating a local backup copy of that data file, and
  (ii) determining, for each data file transferred to the migration storage means, whether the migration file server has already generated a backup copy and responding to an affirmative such determination for omitting that data file from a subsequent local backup copy, while responding to a negative such determination for including the file in the local backup copy.

4. A networked digital data processing system according to claim 3, wherein the migration file server includes restore means for restoring a data file to the client filesystem from a backup copy.

5. A networked digital data processing system according to claim 4, wherein the restore means comprises locating means for determining (i) whether the data portion of a given file to be restored has been transferred to the migration storage means, and (ii) whether the data are present in the migration storage means, and link means for responding to the data portion of a given data file being present in the migration storage means, for restoring a logical link between a directory portion of that data file in the client filesystem and the data portion of that same data file in the migration storage means.

6. A networked digital data processing system according to claim 5, wherein the restore means further comprises means
  (i) responding to the locating means determining that the data portion of a data file was previously transferred to, but not currently stored in, the migration storage means for
    (a) retrieving the data portion of that data file to be restored from the backup copy maintained by the migration file server,
    (b) transferring the data to the migration storage means, and
  (ii) enabling the link means to restore the logical link between the directory portion of the given data file and the data portion of that same data file retrieved from the backup copy.

7. A networked digital data processing system according to claim 1, wherein the migration file server includes client store means for establishing designated client stores in selected areas in the migration storage means, each client store being designated for storing the data portion of files that have been transferred from at least one client filesystem.

8. A networked digital data processing system according to claim 7, wherein the client store means includes means for controlling access to the client stores so that data files in a given client store are accessible only by the filesystems for which that client store is designated.

9. A networked digital data processing system according to claim 8, wherein said client store means permits data files in a given client store to be accessed solely for READ operations.

10. A networked digital data processing system according to claim 7, wherein the client store means includes means for deleting selected client stores.

11. A networked digital data processing system according to claim 7, wherein the client store means includes means for moving a client store from a first are of the migration storage means to a second area of the migration storage means.

12. A networked digital data processing system according to claim 1, wherein the migration file server includes return file transfer means, coupled to the migration storage means and with said selected client device, for responding to a file access request by that client device for transferring the data portion of a requested file stored in the migration storage means to the local file data storage element of that client device.

13. A networked digital data processing system according to claim 12, wherein the migration file server comprises intercept means, coupled to said selected client device, for intercepting and handling selected file access requests transmitted between elements of the client filesystem thereof, the intercept means including A. detection means for detecting selected file access requests transmitted between elements of such client filesystem, B. means, coupled to the detection means for determining whether a requested file has been transferred to the migration storage means, and C. control means, coupled to the return file transfer means,
  (i) for responding to a requested file being stored in the local data storage element for transmitting a detected access request to the succeeding element of the client filesystem in a normal fashion, and
  (ii) for responding to the data portion of the requested file having been previously transferred to the migration storage means and not being stored in a local storage element for
    (a) causing the return file transfer means to transfer the data portion of the requested file from the migration storage means to the client filesystem, and for
    (b) transmitting the access request to the succeeding element of the client filesystem for processing without altering the client filesystem.

14. A networked digital data processing system according to claim 13, wherein

A. the migration file server includes means for storing a set of digital flags representative of the state of data files stored in the migration storage means, and B. the control means of the intercept means includes means updating selected ones of said digital flags upon transfer of the data portion of a requested data file in response to an intercepted access request.

15. A networked digital data processing system according to claim 13, wherein the control means includes means for
  (i) determining, in response to an intercepted write request, whether said local data file storage element has sufficient storage space to store the data portion of a new data file, and
  (ii) responding to a negative such determination for causing the level-responsive transfer means to transfer the data portions of one or more data files from a client filesystem on that local data file storage element to said migration storage means and for effecting release of storage space previously occupied by those data portions.

16. A networked digital data processing system according to claim 1, wherein the migration file server includes means for generating an extended file attribute table containing a set of entries, each of which corresponds to an entry in a directory associated with a client filesystem, and each of which includes a set of digital flags representative of the state of the corresponding data file.

17. A networked digital data processing system according to claim 16, wherein the set of digital flags includes a flag representative of whether the data portion of the corresponding data file has been transferred from the local data file storage element to the migration storage means, transfer from said one or more client filesystems to the migration storage means.

18. A networked digital data processing system according to claim 1, wherein the level-responsive transfer means includes means for responding to said storage utilization level exceeding said selected high watermark level, for transferring data portions of one or more data files from said local data file storage element to the migration storage means until the storage utilization level attains a selected low watermark level.

19. A networked digital data processing system according to claim 18, wherein the level-responsive transfer means includes prestaging means for
  (i) copying, at scheduled times, the data portions of data files from one or more client filesystems to the migration storage means until the storage utilization level has attained a selected prestage reserve level that is lower than said low watermark level, while
  (ii) maintaining copies of those data files in the local data file storage element, so that client devices can continue to operate upon them, and so that storage space utilized by unmodified ones of them can be released in response to a storage utilization level exceeding a selected high watermark level.

20. A networked digital data processing system according to claim 1, wherein the migration file server includes A. means for installing a first subset of routines in the client device operating system for execution thereby, server means, and means for transferring the first subset of routines to the client, B. means for executing a predetermined set of file transfer routines including said first subset of routines.

21. A networked digital data processing system according to claim 20, wherein the migration file server includes de-installation means for disconnecting said migration file server from said client devices without loss of data, the de-installation means including
   i) means for transferring data stored in the migration storage means to other storage elements, and
   ii) means for removing the first subset of routines from the client device operating system.

22. A networked digital data processing system according to claim 1, wherein the migration file server includes dump means for generating a local backup copy of data file, or data portions thereof, stored in any of said local data storage element and said the migration storage means.

23. A networked digital data processing system according to claim 1, wherein said level-responsive transfer means comprises
   means for maintaining in the file directory of said local data file storage element, upon transfer of the data-portion of said data file from said local data file storage element to the migration storage means, an entry for that data file.

24. A networked digital data processing system according to claim 1, wherein the level-responsive transfer means includes scheduler means for establishing a schedule of periodic data file transfer from said one or more client filesystems to the migration storage means.

25. A networked digital data processing system according to claim 1, wherein the level-responsive transfer means includes means, responsive to commands asserted by a user, for transferring data portions of selected files from said local data file storage element to the migration storage means.

26. A networked digital data processing system according to claim 1, wherein the level-responsive transfer means includes means for establishing criteria for establishing a priority for file transfer.

* * * * *